(12) United States Patent
Harada

(10) Patent No.: US 11,252,685 B2
(45) Date of Patent: Feb. 15, 2022

(54) TERMINAL AND RADIO COMMUNICATION METHOD

(71) Applicant: NTT DOCOMO, INC., Tokyo (JP)

(72) Inventor: Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/769,004

(22) PCT Filed: Dec. 4, 2018

(86) PCT No.: PCT/JP2018/044450
§ 371 (c)(1),
(2) Date: Jun. 2, 2020

(87) PCT Pub. No.: WO2019/111862
PCT Pub. Date: Jun. 13, 2019

(65) Prior Publication Data
US 2021/0227479 A1    Jul. 22, 2021

(30) Foreign Application Priority Data

Dec. 4, 2017   (JP) .............................. JP2017-244471

(51) Int. Cl.
*H04W 56/00* (2009.01)
*H04W 24/10* (2009.01)

(52) U.S. Cl.
CPC ......... *H04W 56/001* (2013.01); *H04W 24/10* (2013.01); *H04W 56/004* (2013.01); *H04W 56/0035* (2013.01)

(58) Field of Classification Search
CPC ............. H04W 56/0065; H04W 48/08; H04W 56/001; H04W 36/0085; H04W 48/12; H04W 88/06; H04W 48/16; H04W 8/005; H04W 72/0446; H04W 24/10; H04W 72/005; H04W 38/0085; H04W 24/02; H04W 36/0088; H04W 84/045; H04L 5/0078; H04L 5/001; Y02D 30/70; Y02D 70/1262

See application file for complete search history.

(56) References Cited

U.S. PATENT DOCUMENTS

| | | | |
|---|---|---|---|
| 2014/0206341 A1* | 7/2014 | Siomina ............ | H04W 36/0088 455/422.1 |
| 2017/0181067 A1* | 6/2017 | Schier .................... | H04W 8/005 |
| 2018/0279145 A1* | 9/2018 | Jung ...................... | H04W 24/08 |
| 2019/0053235 A1* | 2/2019 | Novlan .................. | H04L 5/001 |

(Continued)

OTHER PUBLICATIONS

International Search Report issued in PCT/JP2018/044450 dated Feb. 19, 2019 (1 page).

(Continued)

*Primary Examiner* — Jung Liu
(74) *Attorney, Agent, or Firm* — Osha Bergman Watanabe & Burton LLP

(57) ABSTRACT

A terminal is disclosed including a receiver that receives configuration information indicating a gap offset in subframe units related to a measurement gap (MG), and a shift time shorter than one subframe and related to the MG. The terminal further includes a processor that determines a timing of the MG based on the gap offset and the shift time. In other aspects, a radio communication method for a terminal and a base station are also disclosed.

7 Claims, 10 Drawing Sheets

| GAP PATTERN ID | MGL [ms] | MGRP [ms] |
|---|---|---|
| 0 | 6 | 40 |
| 1 | 6 | 80 |

(56) References Cited

U.S. PATENT DOCUMENTS

| | | | | |
|---|---|---|---|---|
| 2019/0254110 A1* | 8/2019 | He | ............ | H04L 5/0048 |
| 2019/0394663 A1* | 12/2019 | Yang | ............ | H04B 7/088 |
| 2020/0015236 A1* | 1/2020 | Kung | ............ | H04W 72/0413 |
| 2020/0137740 A1* | 4/2020 | Lim | ............ | H04B 7/0695 |
| 2020/0314673 A1* | 10/2020 | Deogun | ............ | H04B 7/0632 |
| 2020/0314946 A1* | 10/2020 | Tsuboi | ............ | H04L 5/0094 |
| 2020/0403743 A1* | 12/2020 | Bergqvist | ............ | H04W 56/001 |
| 2021/0051618 A1* | 2/2021 | Yang | ............ | H04W 56/001 |

OTHER PUBLICATIONS

Written Opinion of the International Searching Authority issued in PCT/JP2018/044450 dated Feb. 19, 2019 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Extended European Search Report issued in counterpart European Patent Application No. 18885804.7, dated Aug. 18, 2021 (6 pages).

MediaTek Inc.; "Measurement Gap Design for NR SA"; 3GPP TSG-RAN WG2 #100, R2-1712888; Reno, Nevada, US, Nov. 27-Dec. 1, 2017 (5 pages).

* cited by examiner

| GAP PATTERN ID | MGL [ms] | MGRP [ms] |
| --- | --- | --- |
| 0 | 6 | 40 |
| 1 | 6 | 80 |

TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, the specifications of LTE-A (LTE advanced and LTE Rel. 10, 11, 12 and 13) have also been drafted for the purpose of achieving increased capacity and enhancement beyond LTE (LTE Rel. 8 and 9).

Successor systems of LTE are also under study (for example, referred to as "FRA (Future Radio Access)," "5G (5th Generation mobile communication system)," "5G+ (plus)," "NR (New Radio)," "NX (New radio access)," "FX (Future generation radio access)," "LTE Rel. 14 or 15 and later versions," etc.).

In existing LTE systems (for example, LTE Rels. 8 to 13), a user terminal (UE (User Equipment)) detects synchronization signals ("SS," including, for example, PSS (Primary Synchronization Signal), SSS (Secondary Synchronization Signal), etc.), following initial access procedures (also referred to as "cell search"), synchronizes with the network (for example, a base station (eNB (eNode B))), and identifies the cell to connect with (based on, for example, cell IDs (IDentifiers)).

Also, after the cell search, the user terminal receives broadcast information (MIB (Master Information Block)), which is transmitted in a broadcast channel (PBCH (Physical Broadcast CHannel)), system information (SIB (System Information Block)), which is transmitted in a downlink (DL) shared channel (PDSCH (Physical Downlink Shared CHannel)), and so on, and acquires configuration information (which may be referred to as "broadcast information," "system information," etc.) for communicating with the network.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

For future radio communication systems (for example, NR, 5G, etc.), studies are underway to define signal blocks (also referred to as "SS/PBCH blocks," "SS blocks," etc.) that contain synchronization signals (also referred to as "SS," "PSS" and/or "SSS," "NR-PSS" and/or "NR-SSS," etc.), and broadcast channels (also referred to as "broadcast signals," "PBCHs," "NR-PBCHs," etc.). A set of one or more signal blocks is also referred to as a "signal burst (SS/PBCH burst or SS burst)." In this signal burst, multiple signal blocks are transmitted in different beams at different times (also referred to as "beam sweep," etc.).

In addition, future radio communication systems are under study to conduct measurements using these signal blocks. Here, "measurements" means measuring at least one of the received power (for example, RSRP (Reference Signal Received Power)), the received quality (for example, RSRQ (Reference Signal Received Quality) or SINR (Signal to Interference plus Noise Ratio)) and the received strength (for example, RSSI (Reference Signal Strength Indicator)), and is also referred to as "RRM (Radio Resource Management) measurements" and the like.

The base station configures the timings for measurements in the UE. However, if proper measurement timings are not configured, the performance of the radio communication system may deteriorate due to, for example, the inability to measure the signal to be measured.

The present invention has been made in view of the above, and it is therefore an object of the present invention to provide a user terminal and a radio communication method, whereby measurement timings can be configured properly.

Solution to Problem

In accordance with one aspect of the present invention, a user terminal has a receiving section that receives configuration information indicating a gap offset, in subframe units, related to a measurement gap (MG), and a shift time, shorter than one subframe, related to the MG, and a control section that determines a timing of the MG based on the gap offset and the shift time.

Advantageous Effects of Invention

According to the present invention, measurement timings can be configured properly.

DESCRIPTION OF EMBODIMENTS

In existing LTE, UE supports inter-frequency measurements, in which measurements are conducted in non-serving carriers apart from the connecting serving carriers. In inter-frequency measurements, at least one of the reference signal received power (RSRP), the received signal strength (RSSI (Received Signal Strength Indicator)) and the reference signal received quality (for example, RSRQ) in non-serving carriers is measured.

Here, RSRP is the received power of desired signals, and is measured based on, for example, cell-specific reference signals (CRSs) and the like. Also, RSSI is the total received power of the received power of desired signals, plus the power of interference and noise. RSRQ is the ratio of RSRP to RSSI.

In a measurement gap (MG), UE switches the receiving frequency from the serving carrier to a non-serving carrier, and, by measuring at least one of RSRP, RSSI and RSRQ by using, for example, CRS, switches the receiving frequency from the non-serving carrier to the serving carrier. Here, a measurement gap is an interval for making inter-frequency measurements, and, while in this interval, the UE stops transmission and receipt in the communicating carrier and conducts measurements in another frequency carrier.

Figures 1A, 1B:
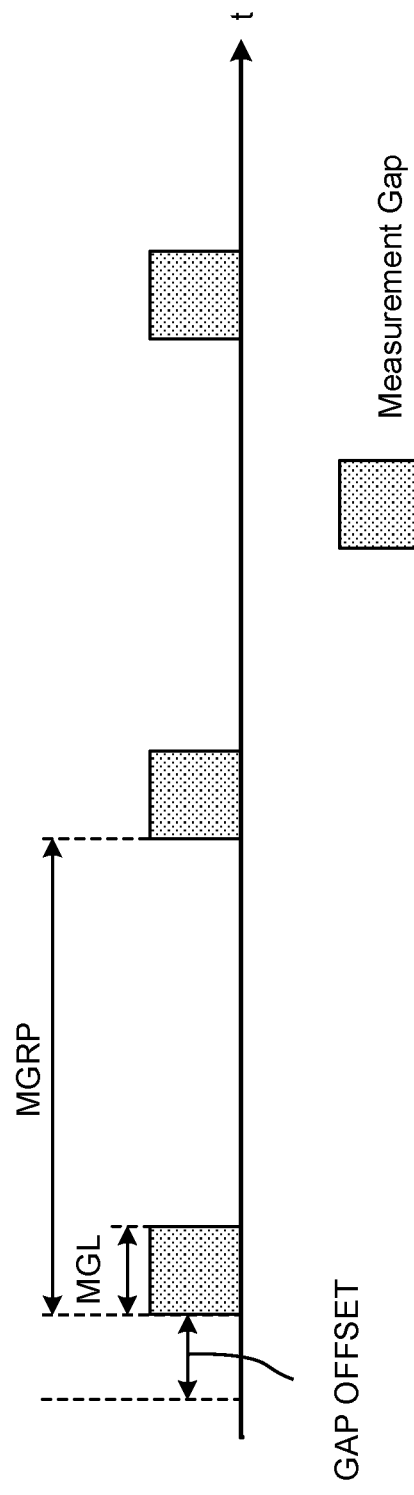
FIGS. 1A and 1B provide diagrams to show examples of MG patterns.

FIG. 1A is a diagram to show an example of an MG pattern. As shown in FIG. 1A, UE uses a given duration (also referred to as a "measurement gap length (MGL)"), repeated every given repetition periodicity (also referred to as "measurement gap repetition period (MGRP)"), as an MG. An MG pattern is determined by the MGL and the MGRP. When the UE receives a gap pattern indicator (gap pattern ID) through higher layer signaling (for example, RRC signaling), the UE can identify the MG pattern based on the indicator.

Also, in inter-frequency measurements, gap offsets may be reported by higher layer signaling (for example, RRC signaling). Here, as shown in FIG. 1A, a gap offset is the starting offset from the top of a given radio frame to the beginning of an MG, indicating the timing of the MG. Note that the UE may identify the MG pattern from a gap offset that is reported. In this case, the MG pattern is implicitly reported.

As shown in FIG. 1B, existing LTE systems use 2 patterns—namely a gap pattern 0, in which the MGL is 6 ms and the MGRP is 40 ms, and a gap pattern 1, in which the MGL is 6 ms and the MGRP is 80 ms. If the MGRP is 40 ms, the gap offset [ms] is reported using an integer between 0 and 39, and, if the MGRP is 80 ms, the gap offset [ms] is reported using an integer between 0 and 79.

The MGL is fixed at 6 ms. The MGL is configured on the assumption that the PSS/SSS transmission periodicity is 5 ms, and that it takes 0.5 ms to switch the frequency from the connecting carrier to the carrier to be measured, and 0.5 ms to switch back the frequency.

In existing LTE systems, 1 MG pattern is configured for 1 UE. If the UE has only 1 RF chain (transmitting/receiving section), the UE conducts measurements by switching between multiple carriers. During the MG, the UE cannot communicate with the connecting carrier.

If the UE is configured to perform inter-frequency measurements for multiple carriers, the measurement periodicity for each carrier is the same. For example, each carrier's measurement periodicity is determined by (MGRP) x (the number of carriers subject to inter-frequency measurements).

Figure 2:
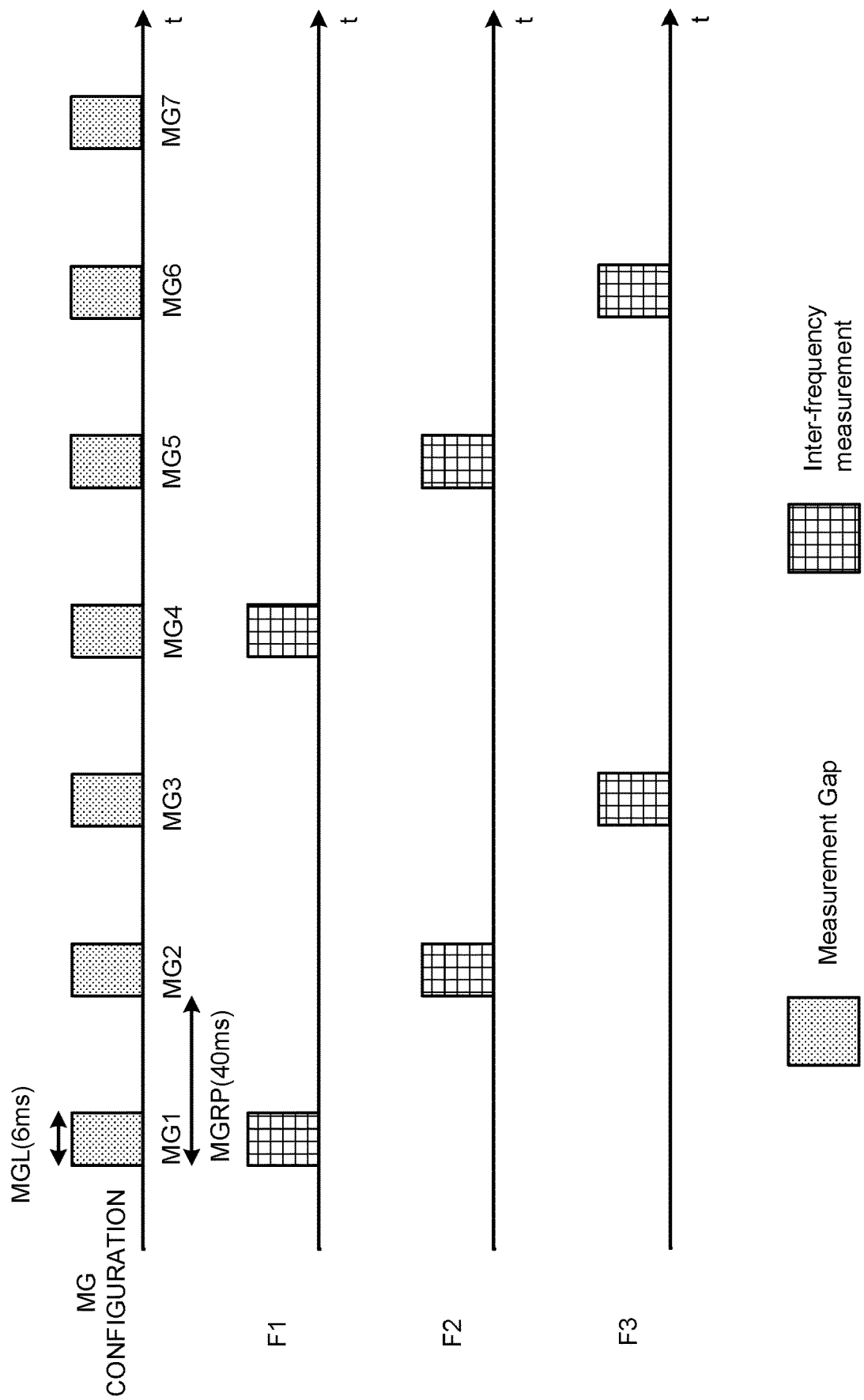
FIG. 2 is a diagram to show examples of inter-frequency measurements.

FIG. 2 is a diagram to show examples of inter-frequency measurements. In this example, 3 non-serving carriers are to be measured and the MGRP is 40 ms, so that the measurement periodicity is 120 ms in each carrier. Thus, an existing MG pattern is configured for a number of carriers to be measured, in common, and 1 MG is used for inter-frequency measurement for 1 of a number of carriers.

For future radio communication systems (for example, NR, 5G, etc.), studies are underway to define signal blocks (also referred to as "SS/PBCH blocks," "SS/PBCH blocks and the like," etc.) that contain synchronization signals (also referred to as "SS," "PSS" and/or "SSS," "NR-PSS" and/or "NR-SSS," etc.), and a broadcast channel (also referred to as "broadcast signal," "PBCH," "NR-PBCH," etc.). A set of one or more signal blocks is also referred to as a "signal burst (SS/PBCH burst or SS burst)." In this signal burst, multiple signal blocks are transmitted in different beams at different times (also referred to as "beam sweep," etc.).

An SS/PBCH block is comprised of one or more symbols (for example, OFDM symbols). To be more specific, an SS/PBCH block may be comprised of a number of symbols that are consecutive. In this SS/PBCH block, PSS, SSS and NR-PBCH may be allocated within one or more different symbols. For example, research is underway to constitute an SS/PBCH block with 4 or 5 symbols—including a PSS of 1 symbol, an SSS of 1 symbol and a PBCH of 2 or 3 symbols.

A set of one or more SS/PBCH blocks may be referred to as an "SS/PBCH burst." For example, an SS/PBCH burst may be formed with SS/PBCH blocks of contiguous frequency and/or time resources, or may be formed with SS/PBCH blocks of non-contiguous frequency and/or time resources. The SS/PBCH burst may be configured based on a given periodicity (may be referred to as "SS/PBCH burst periodicity") or may be configured non-periodically.

A set of one or more SS/PBCH bursts may be referred to as an "SS/PBCH burst set (SS/PBCH burst series)." SS/PBCH burst sets are configured periodically. The user terminal may control receiving processes on the assumption that SS/PBCH burst sets are transmitted periodically (following an SS/PBCH burst set periodicity).

Each SS/PBCH block in an SS/PBCH burst set is identified by a given index (SS/PBCH index). This SS/PBCH index may be any information that uniquely identifies an SS/PBCH block in an SS burst set, and may correspond to a time index.

The user terminal may assume that SS/PBCH blocks having the same SS/PBCH indices are quasi-co-located (QCL (Quaff-Co-Location)), between SS/PBCH burst sets, in terms of at least one of space, average gain, delay and Doppler parameters.

Here, quasi-collocation (QCL) means that it can be assumed that at least one of the space (beams) to use to transmit multiple different SS/PBCH blocks, and the average gain, the delay and the Doppler parameters of the multiple SS/PBCH blocks is the same.

Meanwhile, the user terminal does not have to assume quasi-co-location, in terms of at least one of space, average gain, delay and Doppler parameters, among SS/PBCH blocks having different SS/PBCH indices within SS/PBCH burst sets and/or between SS/PBCH burst sets.

Studies are in progress to support capability signaling to configure MGs for different frequency measurements. The UE may use at least 1 frequency band (carrier frequency) of FR 1 (frequency lower than 6 GHz (sub-6 GHz)) or FR 2

(frequency higher than 24 GHz (above 24 GHz)). Capability signaling can configure different frequency measurement MGs for FR 1 and FR 2, separately.

For example, capability signaling reports the MG length for FR 1-specific gaps and gaps per UE (the length or the duration, including, for example, {3, 4, 6} ms), the MG length for FR 2-specific gaps (for example, {1.5, 3.5, 5.5} ms), and the MG repetition period (for example, {20, 40, 80} ms).

Also, studies are in progress to configure measurement timing configuration using the SS/PBCH blocks (SS/PBCH block-based measurement timing configuration (SMTC)) in the UE. The SMTC window's duration, periodicity, and timing offset and the like are reported as SMTC. In the SMTC window, SS/PBCH blocks to be measured are transmitted.

For example, candidate values for the SMTC window time length (duration or length) for both intra-frequency measurements and inter-frequency measurements are {1, 2, 3, 4, 5} ms.

For example, the SMTC window timing reference for SMTC window timing offsets is the serving cell's SFN (System Frame Number) #0. In IDLE mode, the serving cell may refer to the cell in which UE is located. For example, for intra-frequency measurements, candidate values for SMTC window timing offsets are {0, 1, . . . , SMTC periodicity-1} ms. For example, for inter-frequency measurements, candidate values for SMTC window timing offsets are {0, 1, . . . , SMTC periodicity-1} ms.

For example, for both intra-frequency measurements and inter-frequency measurements, candidate values for the SMTC periodicity are {5, 10, 20, 40, 80, 160} ms.

FR 2 is under study to be used only in TDD bands, and operated synchronously between base stations. In addition, FR 2 is planned to be operated synchronously between carriers.

An SMTC window and MGs are configured in UE for inter-frequency measurements of FR 2. As mentioned earlier, for example, the SMTC window timing offset is specified in units of 1 ms, and the SMTC window duration is specified as {1, 2, 3, 4, 5} in units of 1 ms. On the other hand, the method for specifying MG timing offsets has not been decided yet.

The times at the top and the end of the MG period are used for RF (Radio Frequency) retuning. The UE performs RF retuning to switch the carrier frequency in RF processes (transmitting/receiving processes, frequency conversion process, etc.), from the connecting frequency to the frequency to be measured, during the RF retuning time at the top of the MG, and performs RF retuning to switch from the measurement-target frequency to the connecting frequency during the RF retuning time at the end of the MG. The RF retuning time is, for example, 0.25 ms. The RF retuning time may be defined in the specification.

When the UE measures FR 2 in the MG for FR 2, if the starting timing of the MG is configured to be aligned with the starting timing of the SMTC window, the UE cannot conduct measurements during the RF retuning time at the top and the end of the SMTC window.

Figure 3:
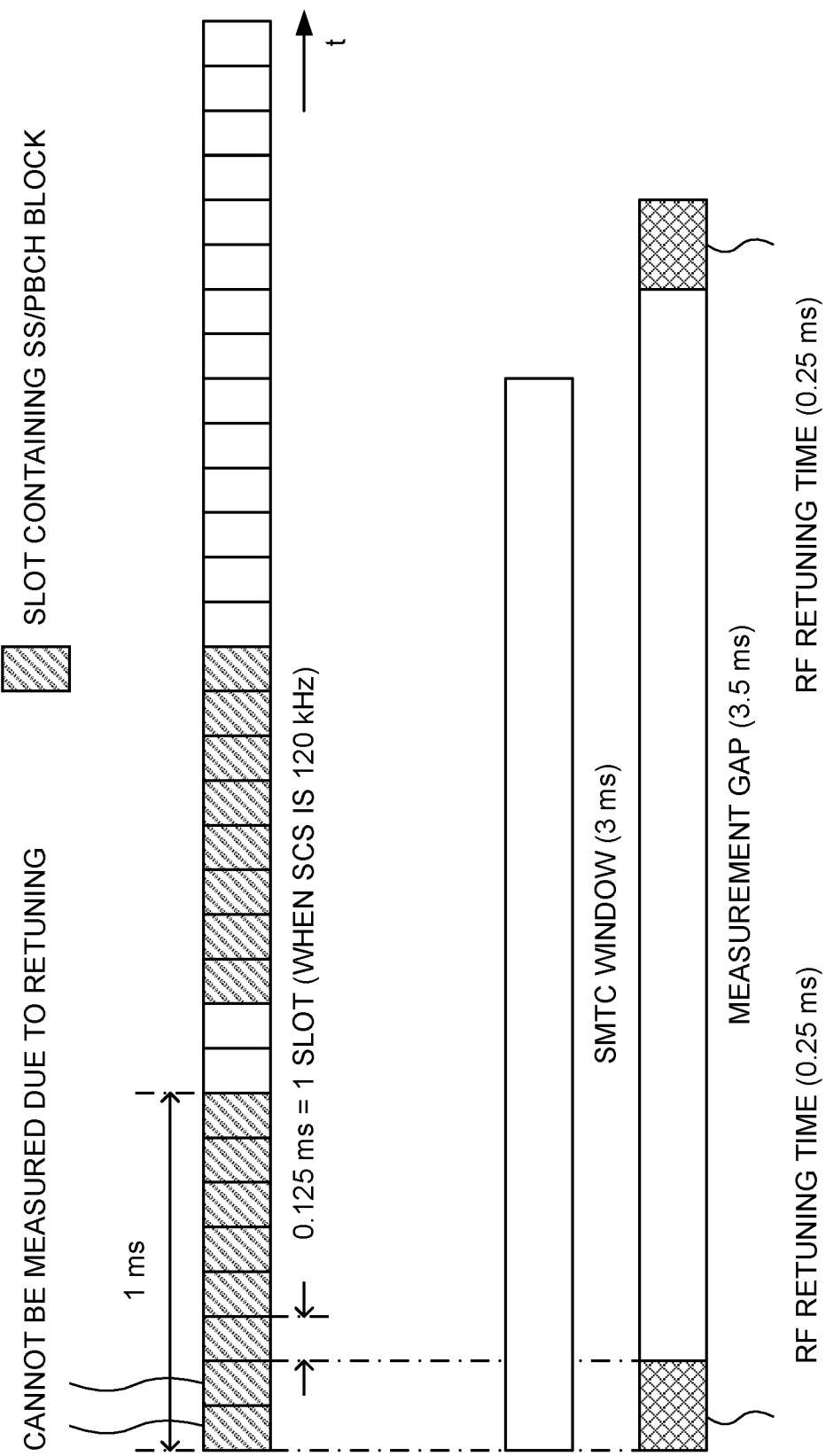
FIG. 3 is a diagram to show an example of the case in which, based on MG configuration, measurement is not possible at the beginning of an SMTC window.

In the example of FIG. 3, FR 2 is the measurement target, the subcarrier spacing (SCS) of the serving cell is 120 kHz, the SMTC window duration is 3 ms, the MG length is 3.5 ms, and the RF retuning time is 0.25 ms. Also, the slot duration is 0.125 ms when the SCS is 120 kHz. Furthermore, for the SCS of 120 kHz, the time locations for SSBs (SS/PBCH blocks) #0 to #31 are configured in the SMTC window. Also, each of the first slot and the second slot in the SMTC window includes SS/PBCH blocks.

In this example, when the starting timing of the MG is configured to be aligned with the starting timing of the SMTC window, RF retuning is in progress in the first and second slots in the SMTC window, and therefore measurements are not possible.

Moreover, in existing LTE systems, the timing offset of the MG is specified in 1-ms units. In the example of FIG. 3, when existing MG timing offset specifying methods are used, the starting timing of measurements in the MG cannot be aligned with the starting timing of the SMTC window.

So, the present inventors have come up with a method for specifying the timing offset for an MG, whereby the time after RF retuning in the MG can be aligned with the starting time of the measurement target (for example, SMTC window).

Now, embodiments of the present invention will be described in detail below with reference to the accompanying drawings. Note that the radio communication methods according to the herein-contained embodiments may be used individually or may be used in combination.

A base station (for example, gNB, network, transmitting/receiving point, etc.) may signal MG configurations to UE via higher layer signaling. The UE conducts measurements using the MG indicated by the MG configurations. The UE conducts measurements after the RF retuning time from the top of the MG. The MG configurations may include at least one of the MG length, the MG repetition period and the MG timing offset.

The base station may signal the SMTC to the UE via higher layer signaling. The UE measures SS/PBCH blocks in the SMTC window indicated by the SMTC in the period in the MG where measurements can be performed (the period apart from the RF retuning periods in the MG). The SMTC may include at least one of the SMTC window duration, the SMTC window periodicity, and the SMTC window timing offset.

The UE may control the offset at a granularity finer than 1 ms, based on configuration information related to the MG timing offset.

Figure 4:
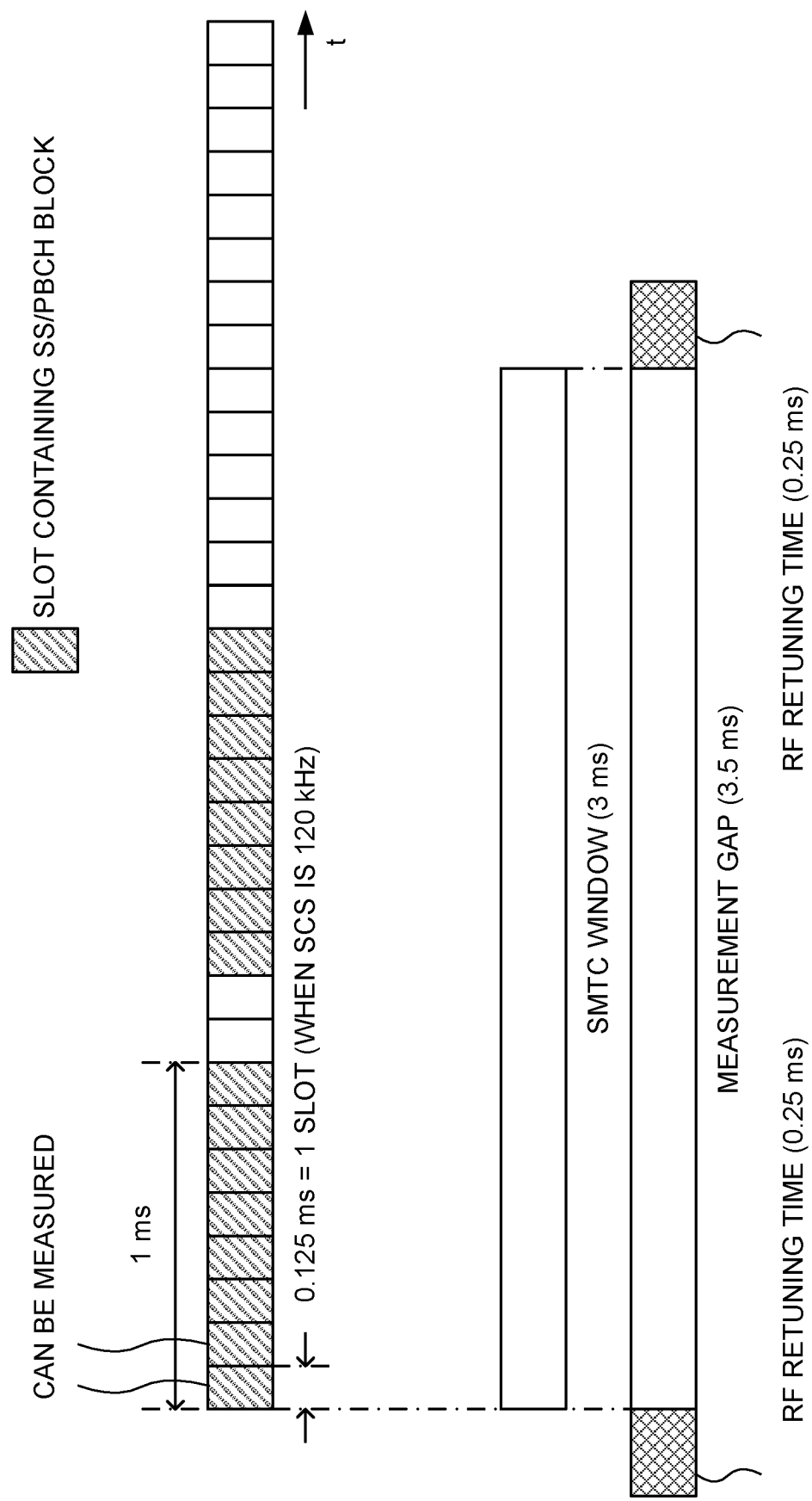
FIG. 4 is a diagram to show an example of the case in which, based on MG configuration, measurement is possible at the beginning of an SMTC window.

Similar to FIG. 3, in the example of FIG. 4, FR 2 is the measurement target, the SCS of the serving cell is 120 kHz, the SMTC window duration is 3 ms, the MG length is 3.5 ms, and the RF retuning time is 0.25 ms. Also, the slot duration is 0.125 ms when the SCS is 120 kHz. Furthermore, for the SCS of 120 kHz, the time locations for SSBs #0 to #31 are configured in the SMTC window. Also, the first slot and the second slot in the SMTC window each include SS/PBCH blocks.

In this example, the granularity of control for the MG starting timing is 0.125 ms. By using this granularity, it is possible to align the ending timing of RF retuning at the top of an MG with the starting timing of the SMTC window.

The period in the MG where measurements can be performed may be coordinated with the SMTC window duration. For example, the MG length may be the time given by adding twice the RF retuning time to the SMTC window duration. In the example of FIG. 4, since the SMTC window duration is 3 ms and the RF retuning time is 0.125 ms, the MG length is 3.5 ms.

Since the granularity of control for the starting timing of the MG is finer than 1 ms, the time of the difference between the measurement starting timing in the MG (the end of RF retuning at the top of the MG) and the starting timing of the SMTC window can be shortened. By shortening this time, the MG length can be shortened. By shortening the MG length, it is possible to shorten the time DL/UL transmission is interrupted in the connecting frequency. By shortening the time to interrupt DL/UL transmission, the decline in throughput can be reduced.

The MG timing offset may be configured in the UE via higher layer signaling. This higher layer signaling may be, for example, one of RRC (Radio Resource Control) signaling, MAC (Medium Access Control) signaling, broadcast information and so on, or a combination of these.

For MAC signaling, for example, a MAC control element (MAC CE (Control Element)), a MAC PDU (Protocol Data Unit), and the like may be used. The broadcast information may be, for example, the master information block (MIB), system information blocks (SIBs), minimum system information (RMSI (Remaining Minimum System Information)), other system information (OSI) and the like.

EXAMPLE 1

In example 1, the MG timing offset in FR 2 may be configured in UE at a granularity finer than 1 ms. In other words, in FR 2, the unit (configuration unit, step, etc.) for specifying MG timing offsets may be smaller than 1 ms. For example, the MG timing offset may be reported to the UE via higher layer signaling (for example, RRC signaling). The MG timing offset may be aligned with the time the RF retuning time before the starting timing of the SMTC window.

EXAMPLE 1-1

The unit (step) of MG timing offsets may be 1 slot. Also, the SCS of the serving cell may be greater than 15 kHz. For example, if the serving cell uses a 120-kHz SCS, the slot duration is 0.125 ms.

If there are multiple serving cells, the slot duration corresponding to the largest SCS among the SCSs of multiple serving cells may be used as the unit of MG timing offsets.

EXAMPLE 1-2

The unit of MG timing offsets may be a given time smaller than 1 ms, regardless of SCS. The given time may be the RF retuning time or a time greater than the RF retuning time. Furthermore, the given time may be the slot duration of a given SCS.

According to example 1, the RF tuning ending timing at the top of an MG and the SMTC window starting timing can be brought close to each other, so that the period in the SMTC window and in the MG where measurements cannot be performed can be reduced.

EXAMPLE 2

The unit for specifying MG timing offsets in FR 2 is 1 ms, and the MG timing offset to be actually configured may be the value given by adding an additional offset to an MG timing offset that is specified. The UE configures the value of the reported MG timing offset, shifted by an additional offset, as an actual MG timing offset.

The additional offset is, for example, "-RF retuning time 0.25 ms." In this case, the UE sets the value given by shifting the reported MG timing offset backward by the RF retuning time, as an actual MG timing offset.

The sign of the additional offset may be negative or positive. The magnitude of the additional offset may be the RF retuning time, or the time given by adding a given value to the RF retuning time. Also, the magnitude of the additional offset may be the slot duration of a given SCS. Also, the magnitude of the additional offset may vary depending on the SCS.

The unit of MG timing offsets may be smaller than 1 ms and greater than the RF retuning time.

EXAMPLE 2-1

Whether or not to add an additional offset may be reported by signaling (for example, higher layer signaling), or may be fixed by the specification.

EXAMPLE 2-2

Whether or not to add an additional offset may be reported by signaling (for example, higher layer signaling), or may be fixed by the specification.

According to example 2, even when the unit of MG timing offsets is greater than the RF retuning time, the RF tuning ending timing at the top of an MG and the SMTC window starting timing can be brought close to each other, so that the period in the SMTC window and in the MG where measurements cannot be performed can be reduced. Also, by making the unit of MG timing offsets coarser than example 1, it is possible to suppress the overhead of reporting of the MG timing offset.

EXAMPLE 3

Also in FR 1, as in example 2, the unit of MG timing offsets is 1 ms, and the actual MG timing offset may be the value given by adding an additional offset to an MG timing offset that is specified.

The magnitude of the additional offset in FR 1 may be different than the magnitude of the additional offset in FR 2. For example, the additional offset in FR 1 may be −0.5 ms.

The sign of the additional offset may be negative or positive. The magnitude of the additional offset may be the RF retuning time, or the time given by adding a given value to the RF retuning time. Also, the magnitude of the additional offset may be the slot duration of a given SCS. Also, the magnitude of the additional offset may vary depending on the SCS.

The magnitude of the additional offset may vary depending on frequency bands. The RF retuning time may vary depending on frequency bands. Depending on frequency bands, different SCSs may be available for use.

According to example 1, the RF tuning ending timing at the top of an MG and the SMTC window starting timing can be brought close to each other, so that the period in the SMTC window and in the MG where measurements cannot be performed can be reduced.

(Variations)

As in examples 1 to 3, when the granularity of control for the starting timing of MGs is finer than 1 ms, cases might occur where an MG overlaps with only part of the subframe or the slot of the serving cell. In existing LTE systems, the starting timing and the ending timing of MGs both always coincide with subframe boundaries.

The UE may be assumed not to receive DL signals (for example, PDCCH and/or PDSCH) and/or transmit UL signals (for example, PUCCH and/or PUSCH) in slots or subframes that at least partially overlaps with MGs. Based on this assumption, even when the starting timing and/or the ending timing of an MG do not coincide with slot or subframe boundaries, the UE can transmit and receive properly.

Alternatively, when transmitting and receiving based on NR, the UE may assume that channels that fulfill specific conditions can be transmitted and received even in slots that partially overlap with MGs. A channel to fulfill specific conditions is a channel that does not overlap with an MG, and that can be processed within that channel. Channels that can be processed within these channels may be, for example, the PDCCH at the top of a slot, the PUCCH at the end of a slot (for example, a short PUCCH), and so on. Based on this assumption, even if part of NR slots overlap with MGs, the UE may be able to transmit and receive part of the channels, so that the throughput can be improved.

(Radio Communication System)

Now, the structure of a radio communication system according to one embodiment of the present invention will be described below. In this radio communication system, communication is performed using 1 of the radio communication methods according to the herein-contained embodiments of the present invention, or a combination of these.

Figure 5:
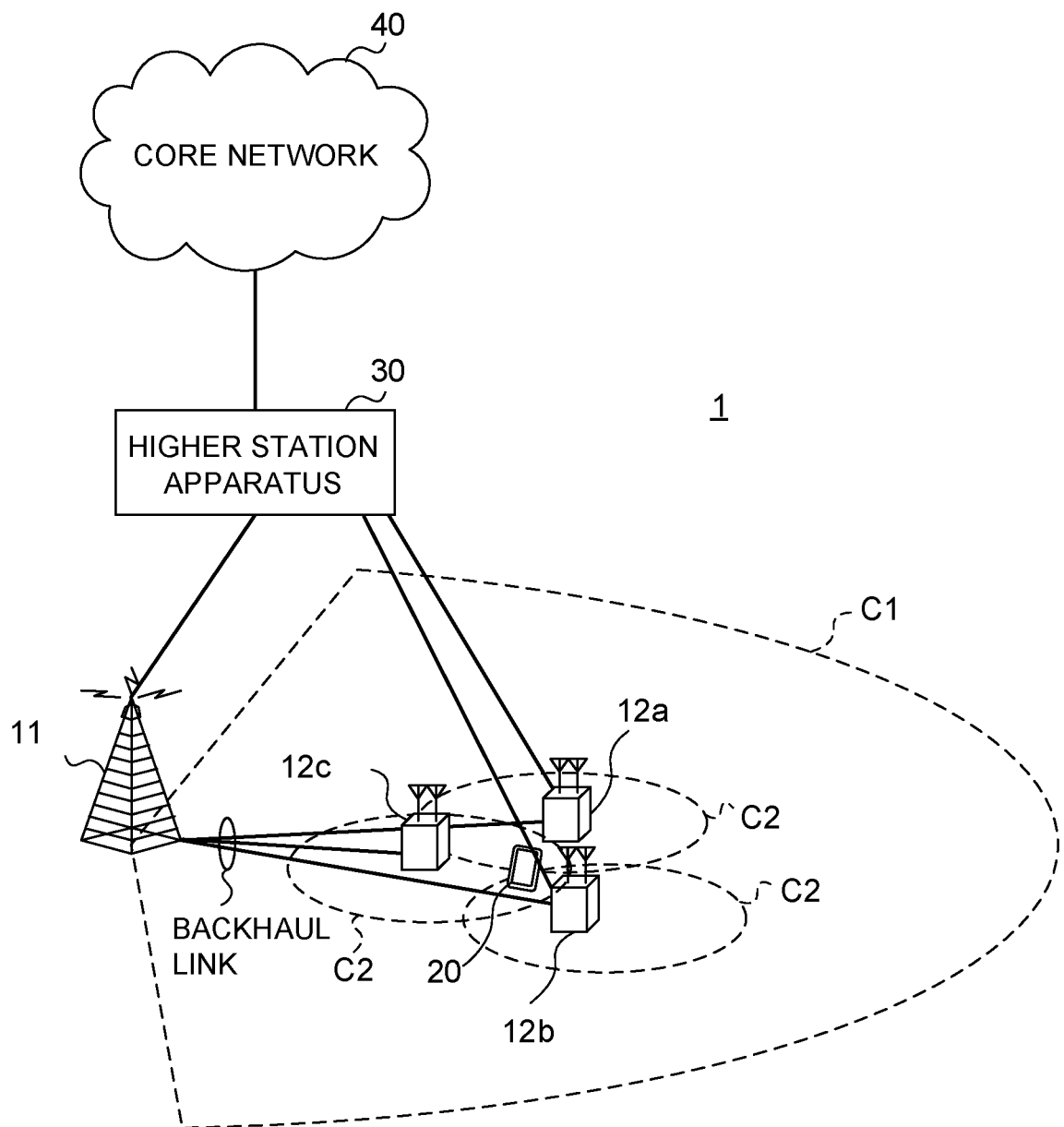
FIG. 5 is a diagram to show an exemplary schematic structure of a radio communication system according to one embodiment of the present invention.

FIG. 5 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement, number and so on of cells and user terminals are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, 5 or fewer CCs or 6 or more CCs).

Between the user terminals 20 and the radio base station 11, communication can be carried out using a carrier of a relatively low frequency bandwidth (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with 1 or continuous resource blocks per terminal, and allowing a number of terminals to use mutually different bands. Note that, uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data CHannel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication systems 1, the cell-specific reference signal (CRS (Cell-specific Reference Signal)), the channel state information reference signal (CSI-RS (Channel State Information-Reference Signal)), the demodulation reference signal (DMRS (DeModulation Reference Signal)), the positioning reference signal (PRS (Positioning Reference Signal)) and so on are communicated as downlink reference signals. Also, in the radio communication system 1, the measurement reference signal (SRS (Sounding Reference Signal)), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 6:
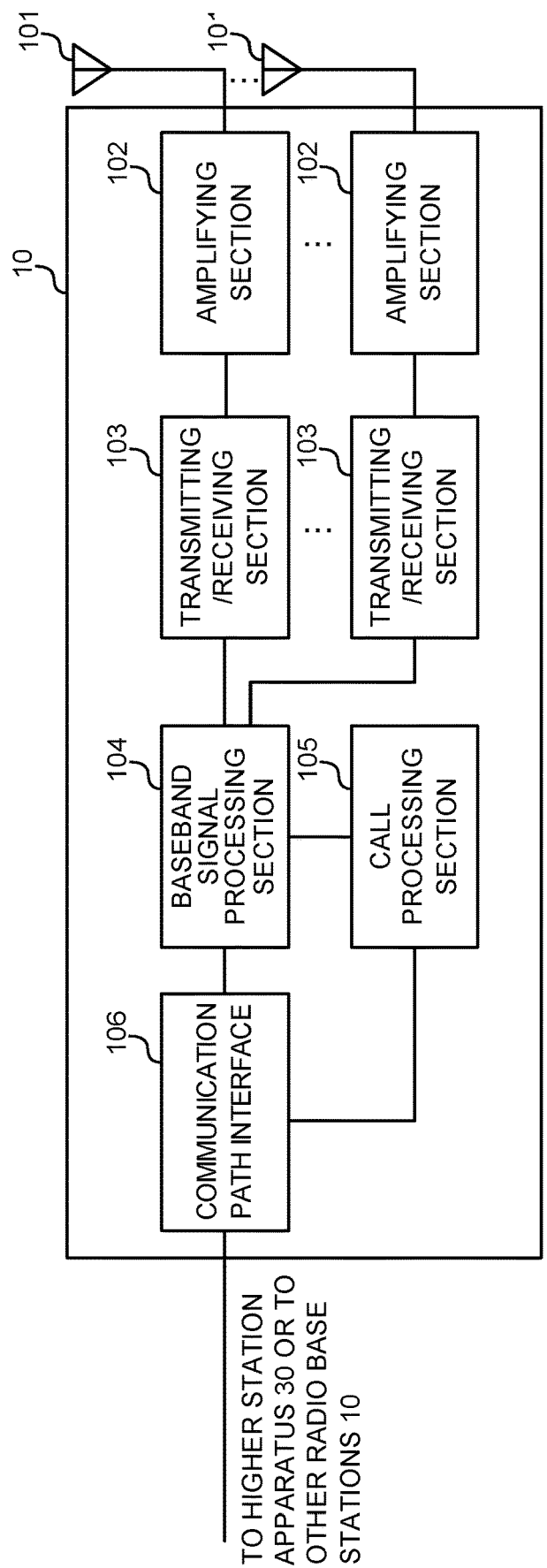
FIG. 6 is a diagram to show an exemplary overall structure of a radio base station according to one embodiment of the present invention.

FIG. 6 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

In addition, the transmitting/receiving sections 103 may transmit, to the user terminal 20, information about the measurement gap pattern (for example, single-MG pattern or non-contiguous MG pattern) to use when measuring a plurality of synchronization signal blocks (for example, SS blocks in an SS burst set). Also, the transmitting/receiving sections 103 may transmit synchronization signal blocks (for example, SS blocks) based on a synchronization signal block pattern that is comprised of a plurality of synchronization signal blocks (for example, SS burst set, localized SS block, distributed SS block etc.).

The transmitting/receiving sections 103 of each of a plurality of cells (for example, an asynchronous network) may transmit synchronization signal blocks asynchronously with respect to each other.

Also, the transmitting/receiving sections 103 may transmit the synchronization signal blocks (for example, SS/PBCH blocks) during periods that are the configured (for example, in the SMTC window).

Also, the transmitting/receiving sections 103 may transmit information about the configurations of measurement of synchronization signal blocks (for example, SMTC). Also, the transmitting/receiving sections 103 may transmit information about the configurations of measurement gaps (for example, MG configurations).

Figure 7:
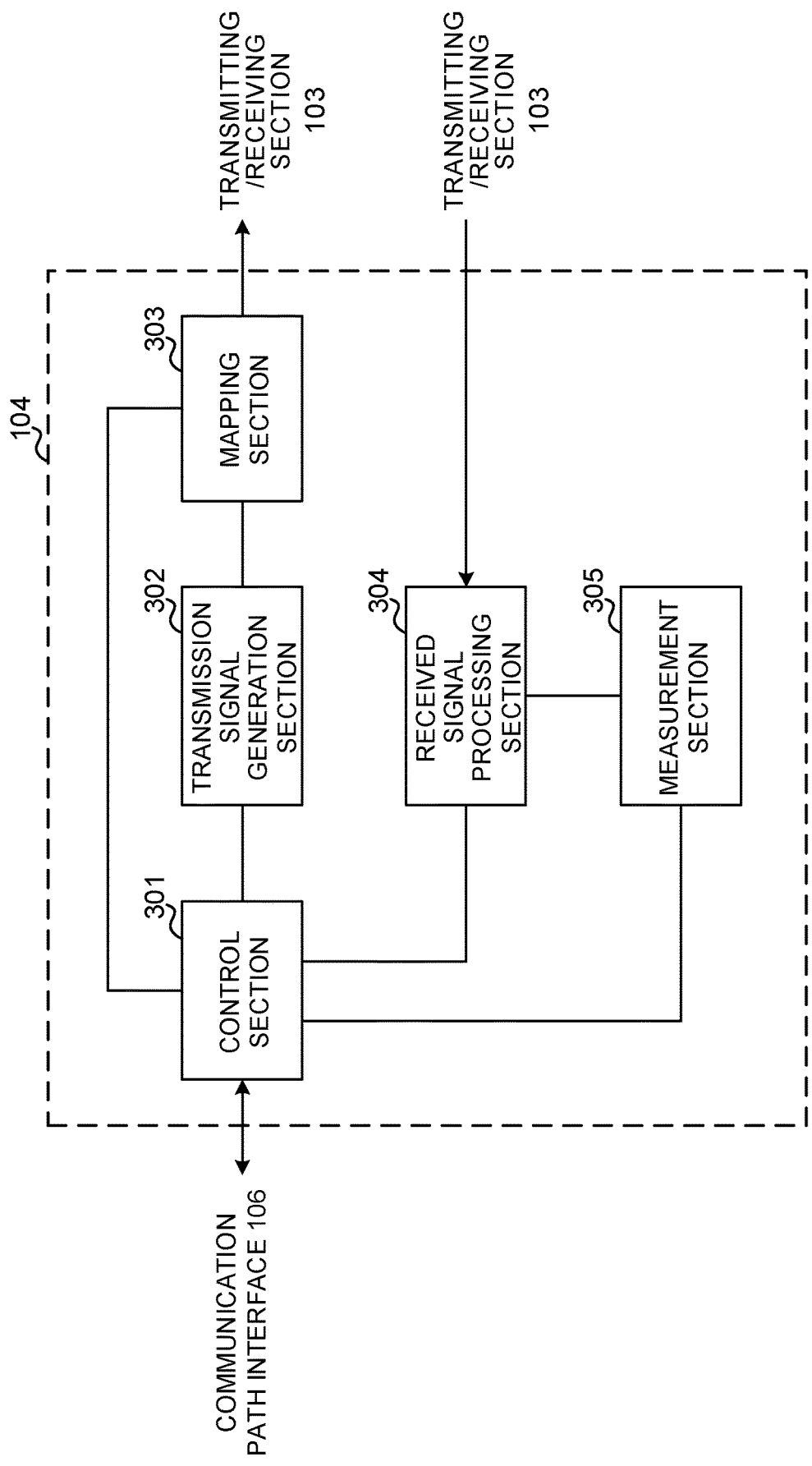
FIG. 7 is a diagram to show an exemplary functional structure of a radio base station according to one embodiment of the present invention.

FIG. 7 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 controls scheduling such as uplink data signal (for example, signal transmitted on PUSCH, uplink control signals (for example, signals transmitted on PUCCH and/or PUSCH, including delivery acknowledgment information of delivery dependency, etc.), random access preamble (for example, a signal transmitted on PRACH) and uplink reference signal.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which signal downlink data allocation information, and/or UL grants, which signal uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can b e described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

Also, the transmitting/receiving sections 103 may transmit information about the configurations of measurements of synchronization signal blocks (for example, SMTC). Also, the transmitting/receiving sections 103 may transmit information about the configurations of measurement gaps (for example, MG configurations).

(User Terminal)

Figure 8:
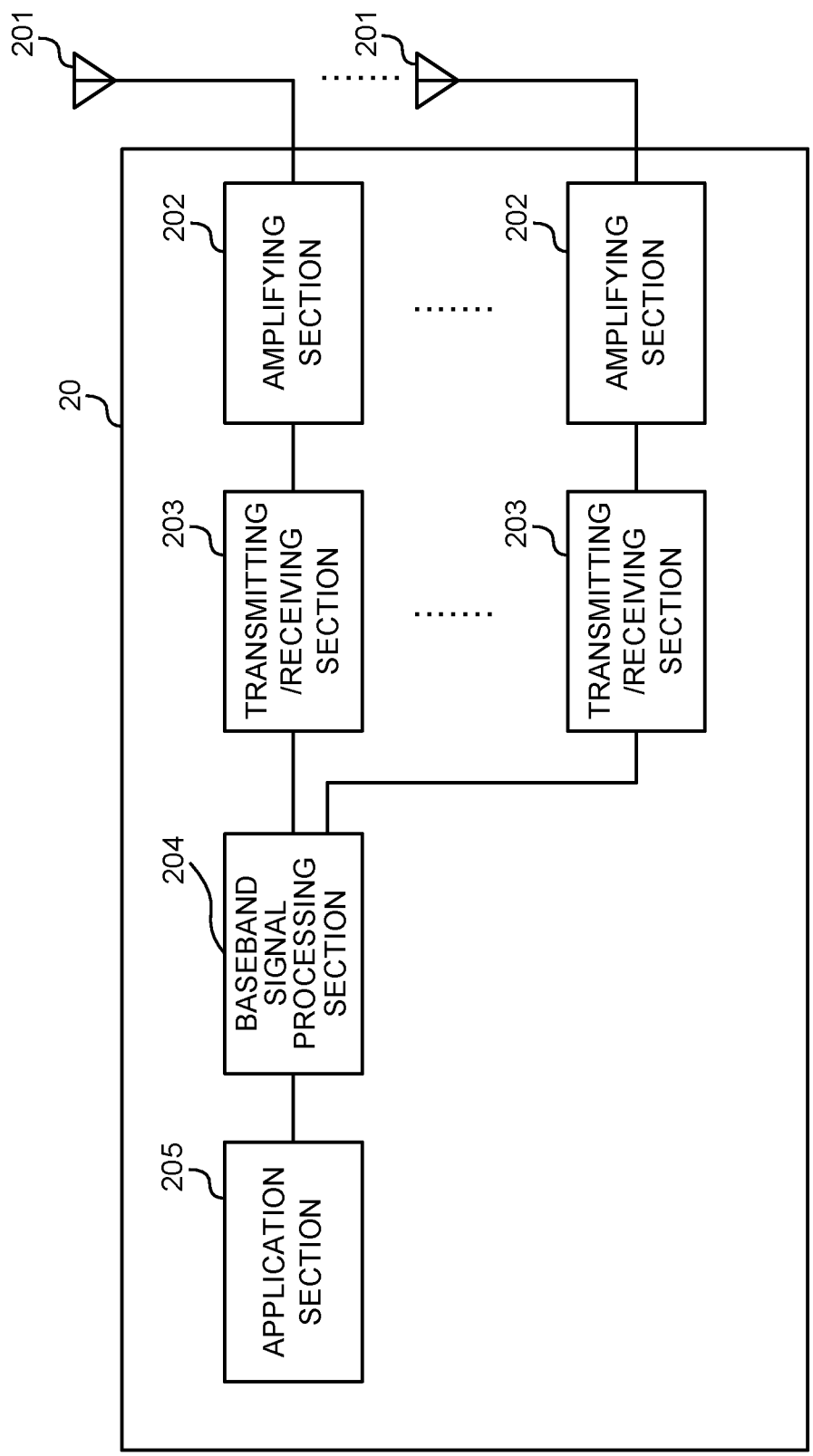
FIG. 8 is a diagram to show an exemplary overall structure of a user terminal according to one embodiment of the present invention.

FIG. 8 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 may receive synchronization signal blocks (for example, SS/PBCH blocks) in measurement gaps.

Figure 9:
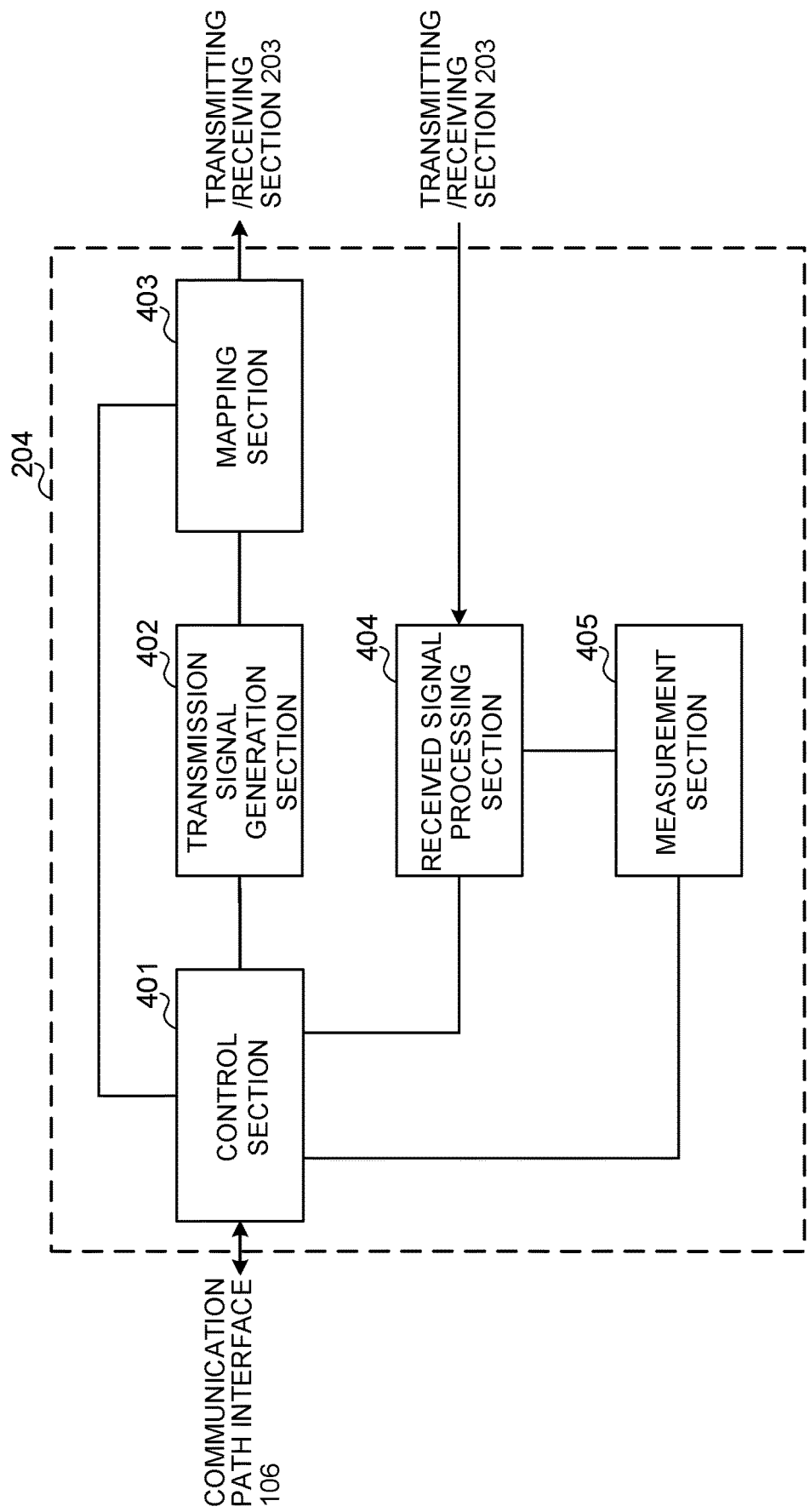
FIG. 9 is a diagram to show an exemplary functional structure of a user terminal according to one embodiment of the present invention.

FIG. 9 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

Also, the measurement section 405 may measure synchronization signal blocks in measurement gaps.

The control section 401 may also control the timing at a granularity finer than 1 millisecond, based on configuration information (for example, MG configurations) about the timing offsets of measurement gaps (for example, MG timing offsets).

Also, the control section 401 may determine the timing for measurements based on information (for example, SMTC) about the timing for measuring synchronization signal blocks (for example, the SMTC window). Also, the start of measurement timings may be after retuning (for example, RF retuning) in the receiving section at the top of a measurement gap (for example, transmitting/receiving sections 203).

Also, the granularity may be based on the slot duration of the serving cell.

Also, the control section 401 may use, as an offset, a value given by adding a given additional offset (for example, RF retuning time, slot duration) to the value indicated in the configuration information.

Also, in the configuration information, an additional offset for the measurement gap timing for a frequency (for example, FR 1) lower than a given frequency may be different from an additional offset for the measurement gap timing for a frequency (for example, FR 2) higher than the given frequency.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 10:
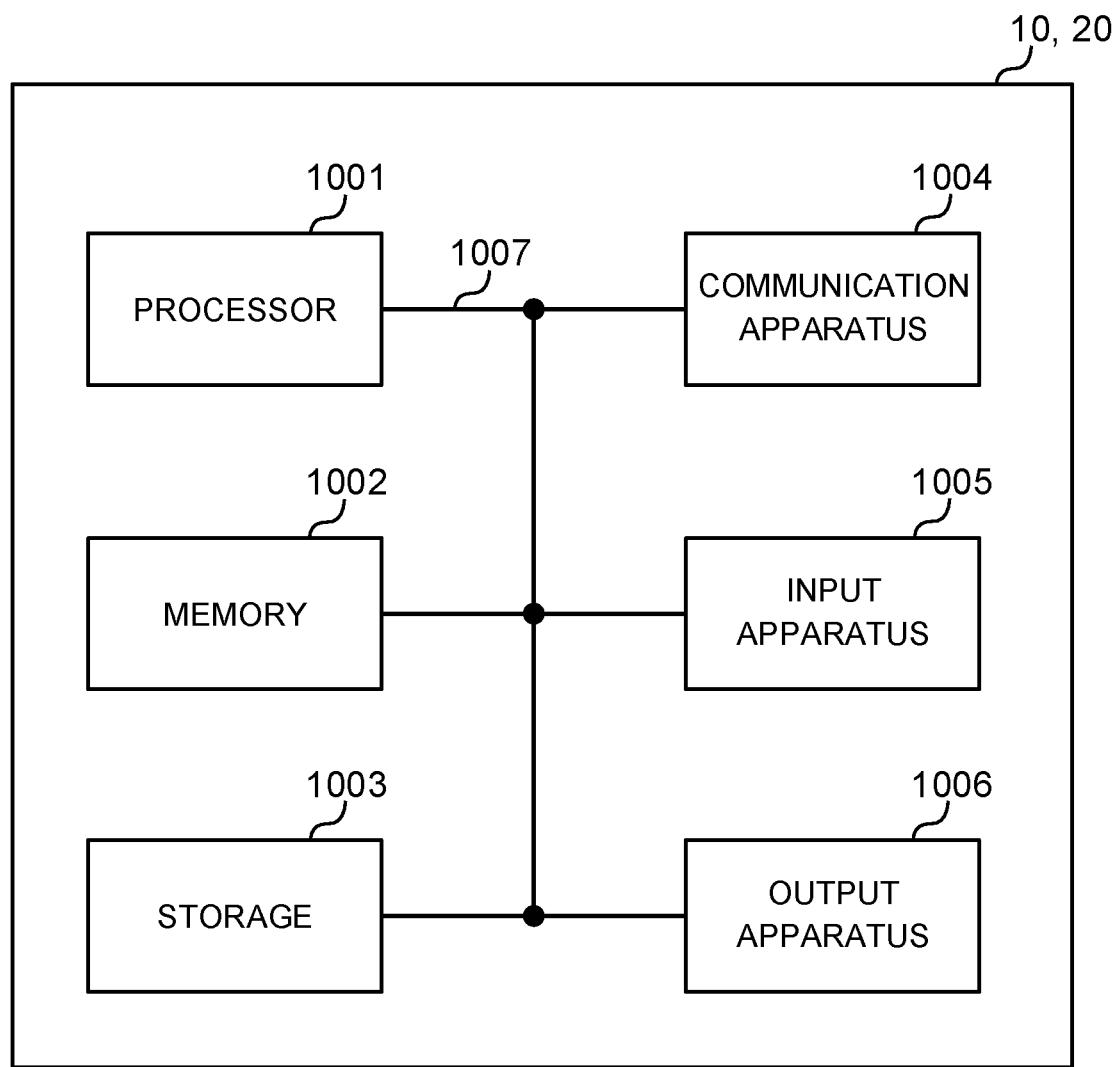
FIG. 10 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 10 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read given software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device,"

a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD).

For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of contiguous subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," a "mini-slot," a "sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of contiguous subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource region of 1 subcarrier and 1 symbol.

Note that the structures of radio frames, subframes, slots, minislots, symbols and so on described above are merely examples. For example, configurations pertaining to the number of subframes included in a radio frame, the number of slots included per subframe or radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to given values, or may be represented using other applicable information. For example, a radio resource may be specified by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent in an implicit way (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes.

In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the invention according to the present disclosure has been described in detail above, it should be obvious to a person skilled in the art that the invention according to the present disclosure is by no means limited to the embodiments described herein. The invention according to the present disclosure can be implemented with various corrections and in various modifications, without departing from the spirit and scope of the present invention defined by the recitations of claims. Consequently, the description herein is provided only for the purpose of explaining examples, and should by no means be construed to limit the invention concerning this disclosure in any way.

(Additional Notes)

Now, supplementary ideas about the present disclosure will be provided below for additional explanation.

[Configuration 1]

A user terminal comprising:

a receiving section that receives a synchronization signal block in a measurement gap; and a control section that controls the timing at a granularity finer than 1 millisecond, based on configuration information about the timing offset for the measurement gap.

[Configuration 2]

The user terminal according to configuration 1, in which:

the control section determines the measurement timing based on the information about the measurement timing of the synchronization signal block; and the start of the measurement timing is after retuning in the receiving section at the top of the measurement gap.

[Configuration 3]

The user terminal according to configuration 1 and configuration 2, in which the granularity is based on the slot duration of a serving cell.

[Configuration 4]

The user terminal according to one of configuration 1 to configuration 3, in which the control section uses, as the offset, a value given by adding a given additional offset to the value indicated in the configuration information.

[Configuration 5]

The user terminal according to configuration 4, in which, in the configuration information, an additional offset for a measurement gap timing for a frequency lower than a given frequency is different from an additional offset for a measurement gap timing for a frequency higher than the given frequency.

[Configuration 6]

A radio communication method for a user terminal, comprising the steps of:

a receiving section that receives a synchronization signal block in a measurement gap; and a control section that controls the timing at a granularity finer than 1 millisecond, based on configuration information about the timing offset for the measurement gap.

The disclosure of Japanese Patent Application No. 2017-244471, filed on Dec. 4, 2017, including the specification, drawings and abstract, is incorporated herein by reference in its entirety.

The invention claimed is:

1. A terminal comprising:
   a receiver that receives configuration information indicating:
     a gap offset in subframe units related to a measurement gap (MG), and
     a shift time shorter than one subframe and related to the MG; and
   a processor that determines a timing of the MG based on the gap offset and the shift time,
   wherein the shift time for a first frequency range is one of 0 ms and 0.5 ms,
   the shift time for a second frequency range is one of 0 ms and 0.25 ms, and
   a frequency within the second frequency range is higher than a frequency within the first frequency range.

2. The terminal according to claim 1, wherein the processor determines a start timing of the MG by shifting a timing based on the gap offset backward by the shift time.

3. The terminal according to claim 1, wherein the processor does not perform reception of downlink data nor transmission of uplink data in at least one of a slot and a subframe of a serving cell that overlaps at least a part of the MG.

4. The terminal according to claim 1, wherein the frequency within the first frequency range is lower than 6 GHz, and
   the frequency within the second frequency range is higher than 24 GHz.

5. A radio communication method for a terminal comprising:
   receiving configuration information indicating:
     a gap offset in subframe units related to a measurement gap (MG), and
     a shift time shorter than one subframe and related to the MG; and
   determining a timing of the MG based on the gap offset and the shift time,
   wherein the shift time for a first frequency range is one of 0 ms and 0.5 ms,
   the shift time for a second frequency range is one of 0 ms and 0.25 ms, and
   a frequency within the second frequency range is higher than a frequency within the first frequency range.

6. A base station comprising:
   a processor that determines, based on a timing of a measurement gap (MG), configuration information indicating:
     a gap offset in subframe units related to the MG, and
     a shift time shorter than one subframe and related to the MG; and
   a transmitter that transmits the configuration information
   wherein the shift time for a first frequency range is one of 0 ms and 0.5 ms,
   the shift time for a second frequency range is one of 0 ms and 0.25 ms, and
   a frequency within the second frequency range is higher than a frequency within the first frequency range.

7. A system comprising a terminal and a base station, wherein:
   the terminal comprises:
     a receiver that receives configuration information indicating:
       a gap offset in subframe units related to a measurement gap (MG), and
       a shift time shorter than one subframe and related to the MG; and
     a processor that determines a timing of the MG based on the gap offset and the shift time, and
   the base station comprises:
     a transmitter that transmits the configuration information,
   wherein the shift time for a first frequency range is one of 0 ms and 0.5 ms,
   the shift time for a second frequency range is one of 0 ms and 0.25 ms, and
   a frequency within the second frequency range is higher than a frequency within the first frequency range.

* * * * *